E. J. & M. J. BARKER & F. B. LA BARR.
PRINTING PRESS.
APPLICATION FILED MAR. 16, 1904.
992,146.
Patented May 16, 1911.
10 SHEETS—SHEET 1.
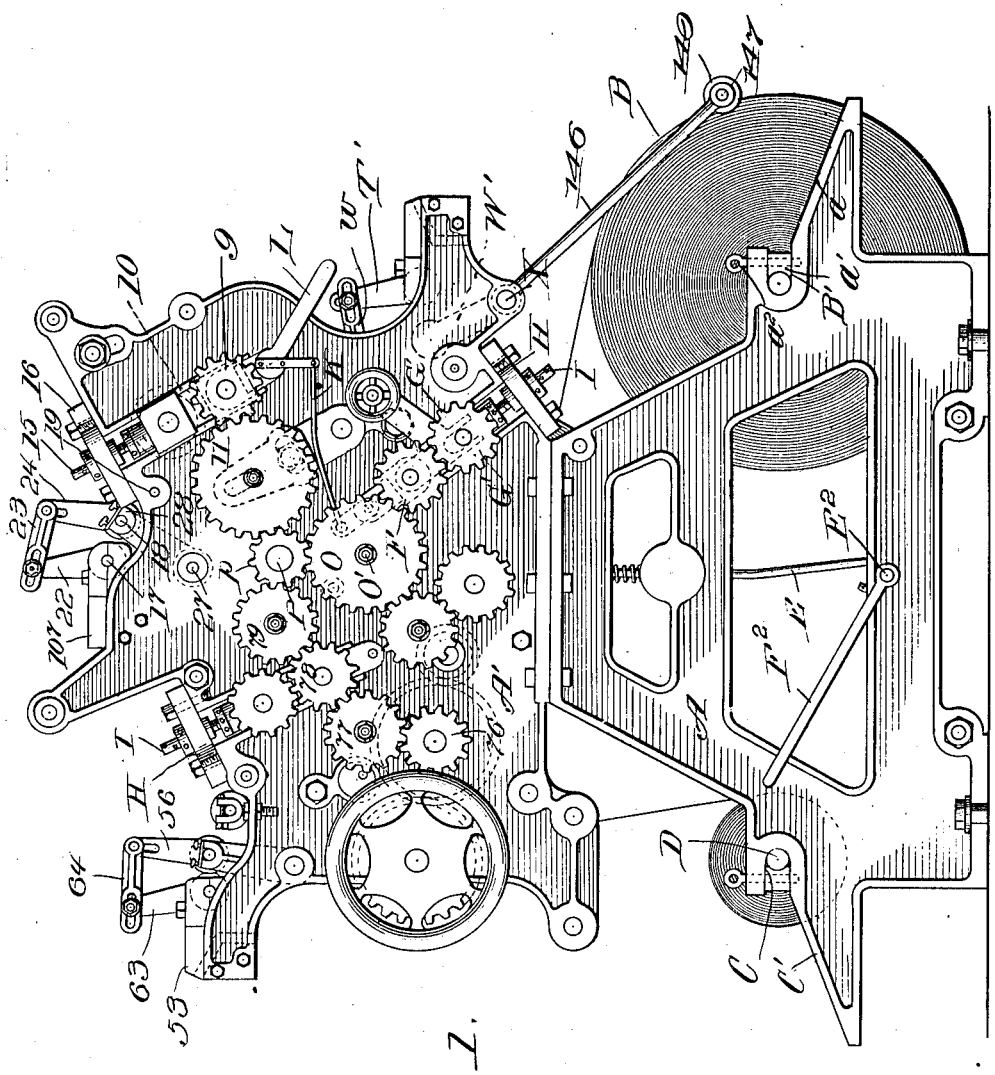

E. J. & M. J. BARKER & F. B. LA BARR.
PRINTING PRESS.
APPLICATION FILED MAR. 16, 1904.
992,146.
Patented May 16, 1911.
10 SHEETS—SHEET 2.
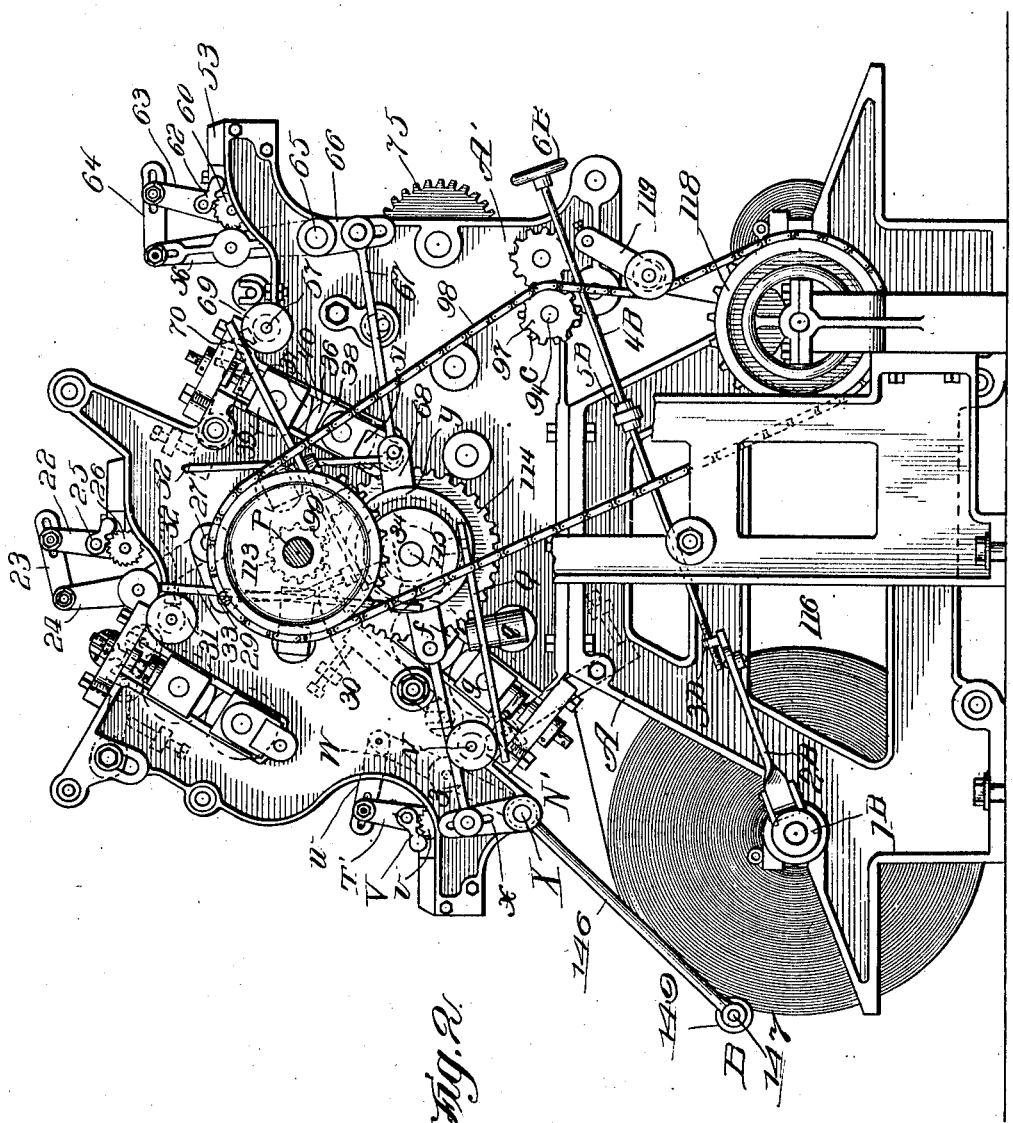

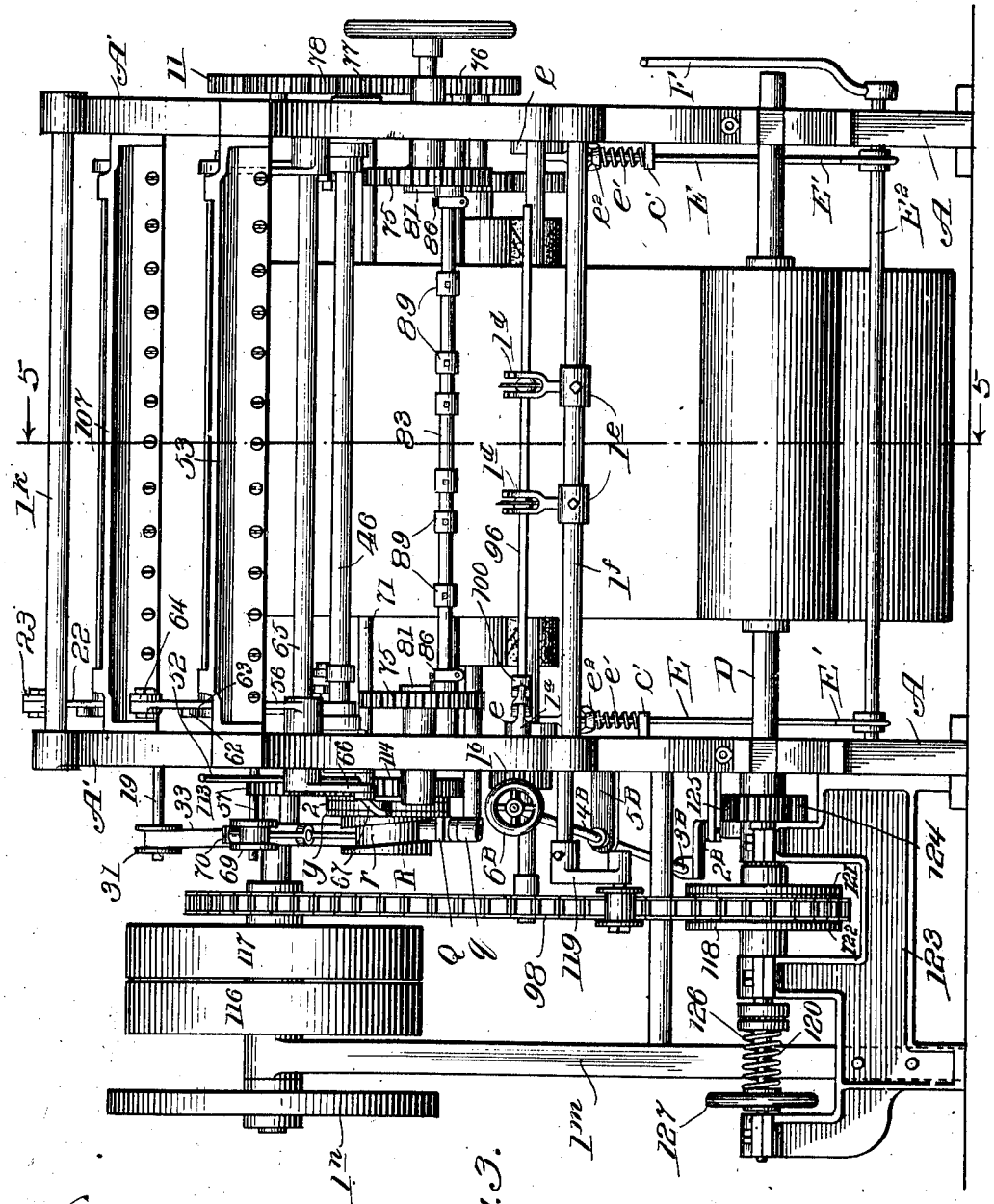

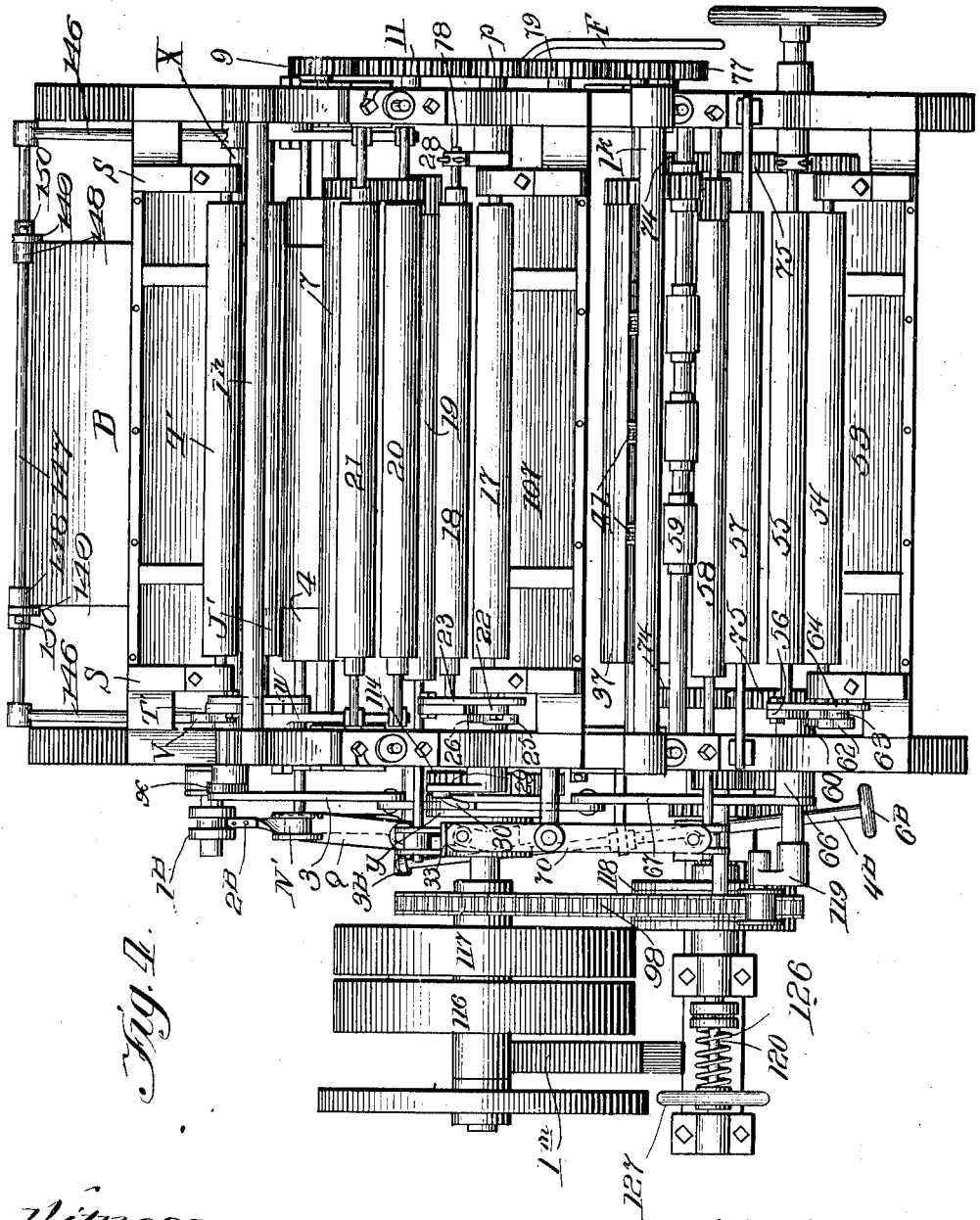

E. J. & M. J. BARKER & F. B. LA BARR.
PRINTING PRESS.
APPLICATION FILED MAR. 16, 1904.
992,146.
Patented May 16, 1911.
10 SHEETS—SHEET 5.
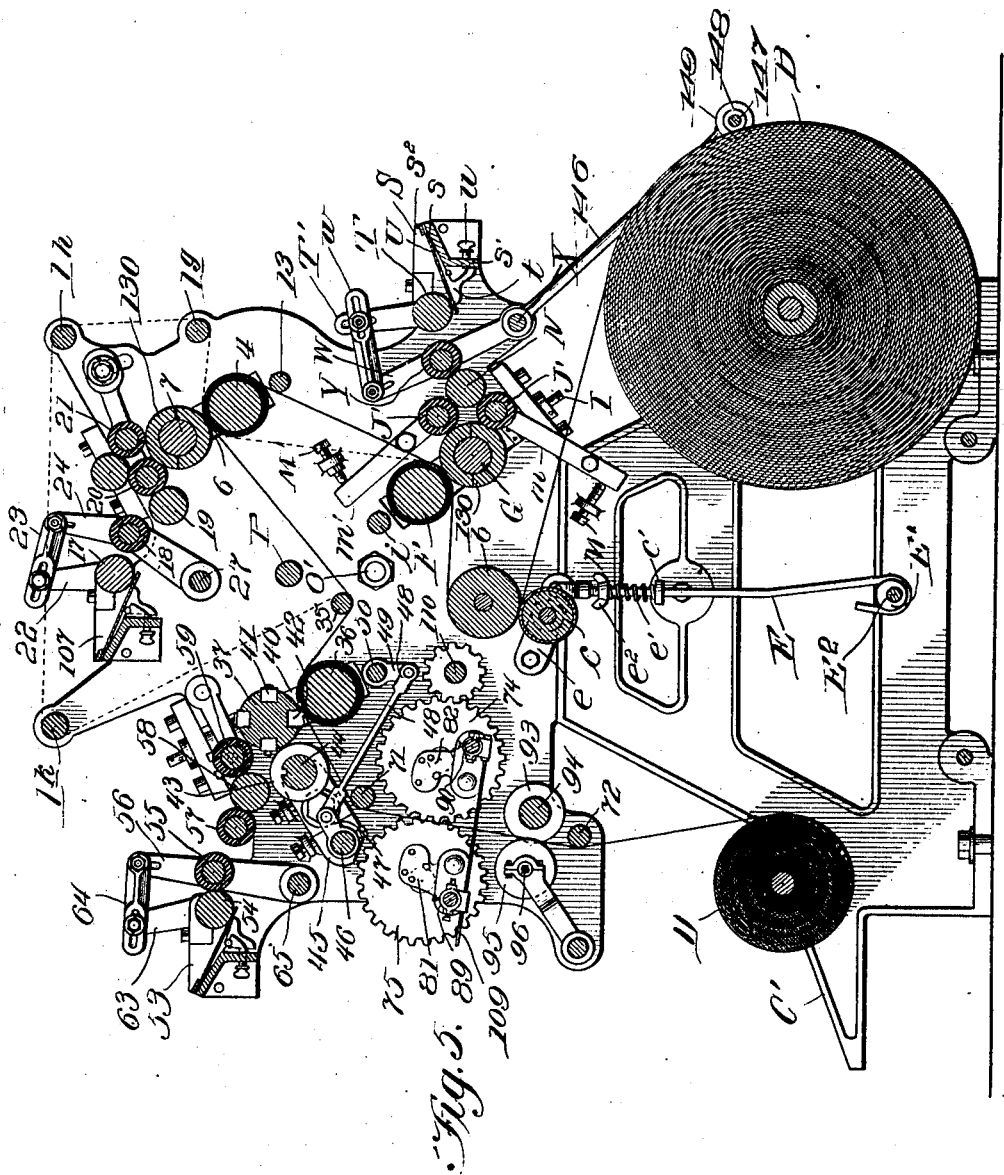

E. J. & M. J. BARKER & F. B. LA BARR.
PRINTING PRESS.
APPLICATION FILED MAR. 16, 1904.
992,146.
Patented May 16, 1911.
10 SHEETS—SHEET 6.
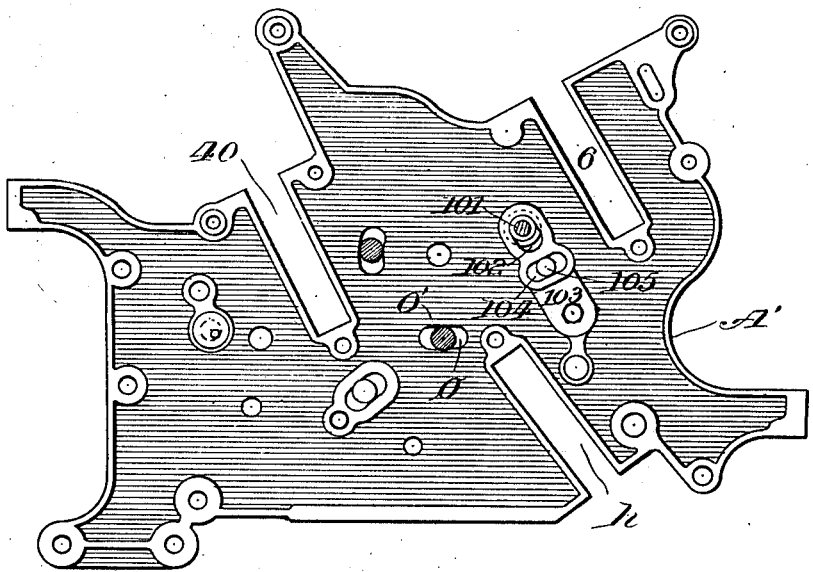
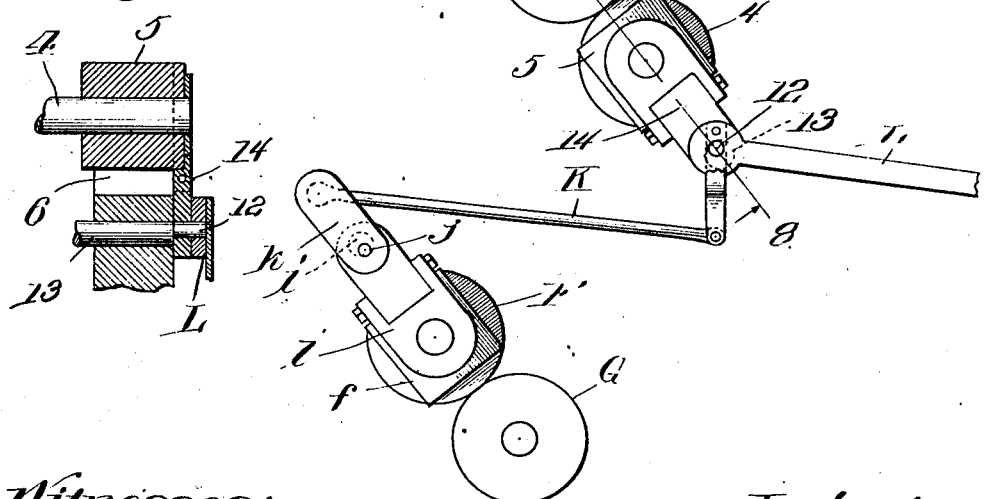

E. J. & M. J. BARKER & F. B. LA BARR.
PRINTING PRESS.
APPLICATION FILED MAR. 16, 1904.
992,146.
Patented May 16, 1911.
10 SHEETS—SHEET 7.
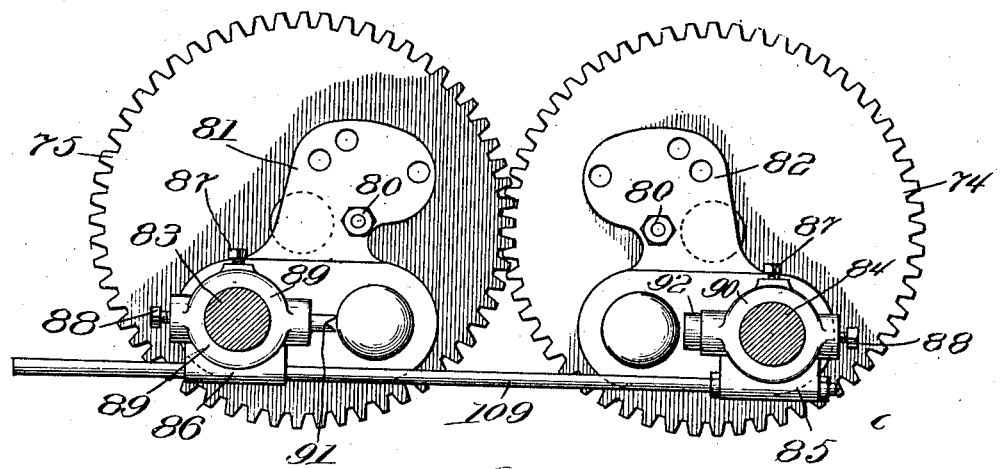
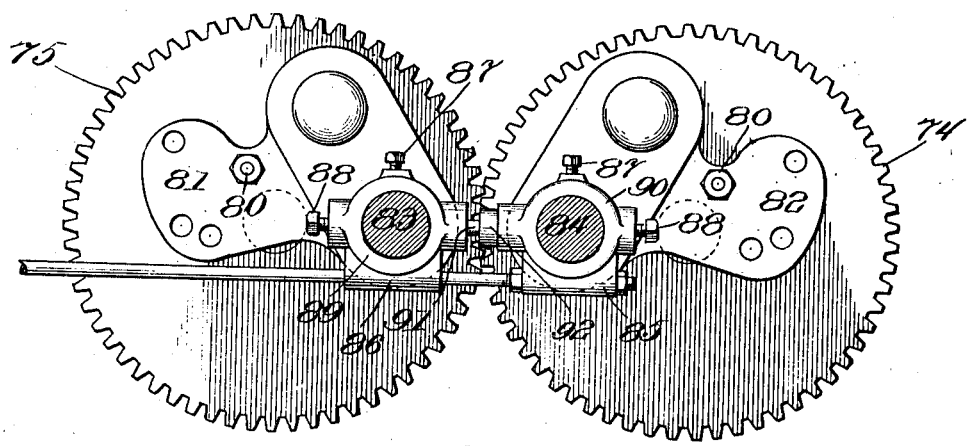

E. J. & M. J. BARKER & F. B. LA BARR.
PRINTING PRESS.
APPLICATION FILED MAR. 16, 1904.
992,146.
Patented May 16, 1911.
10 SHEETS—SHEET 8.
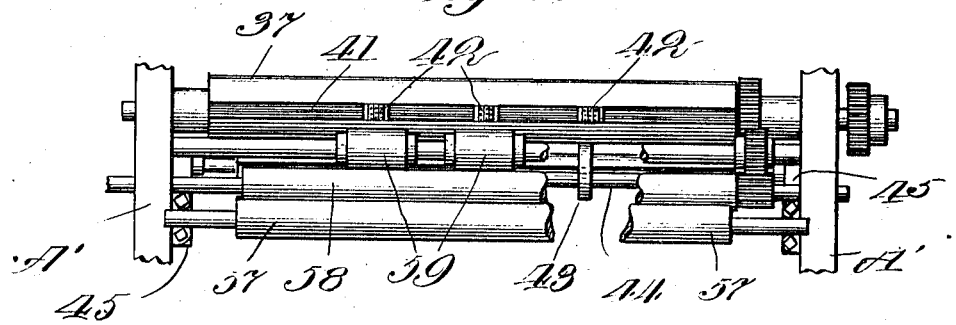
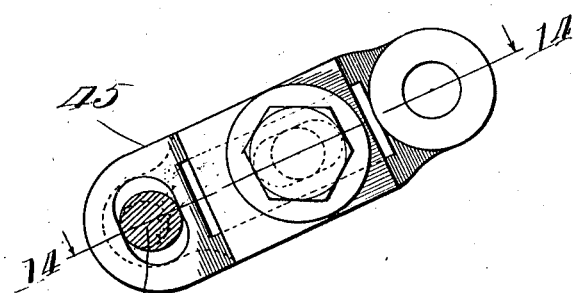
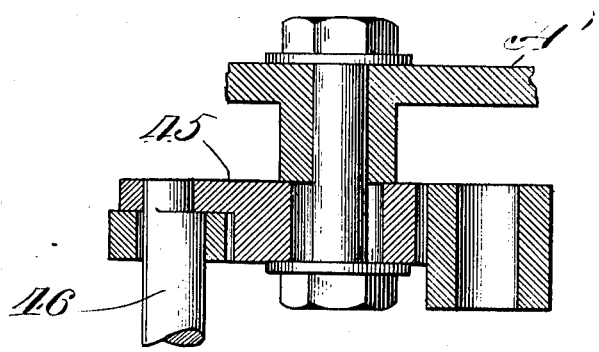

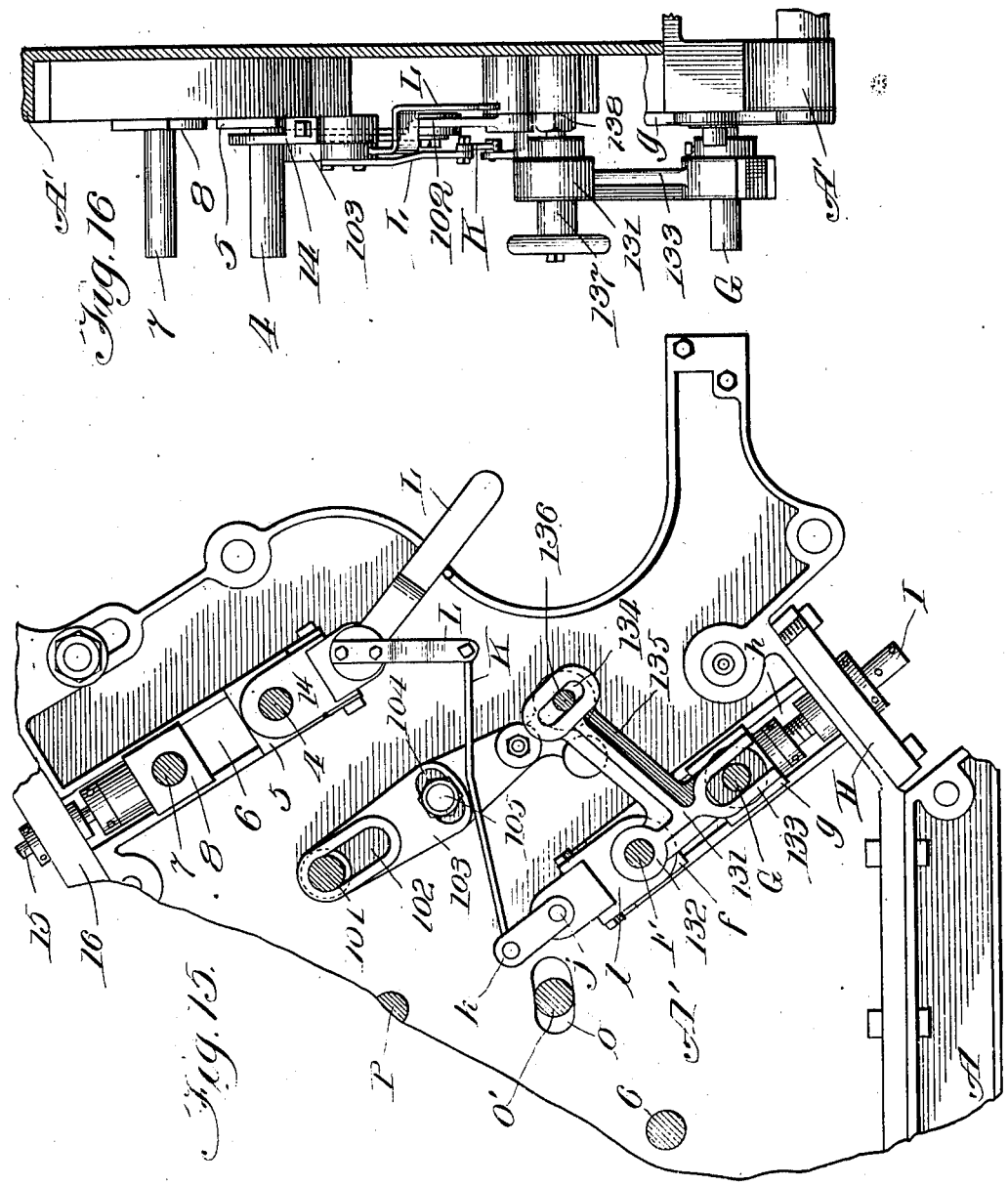

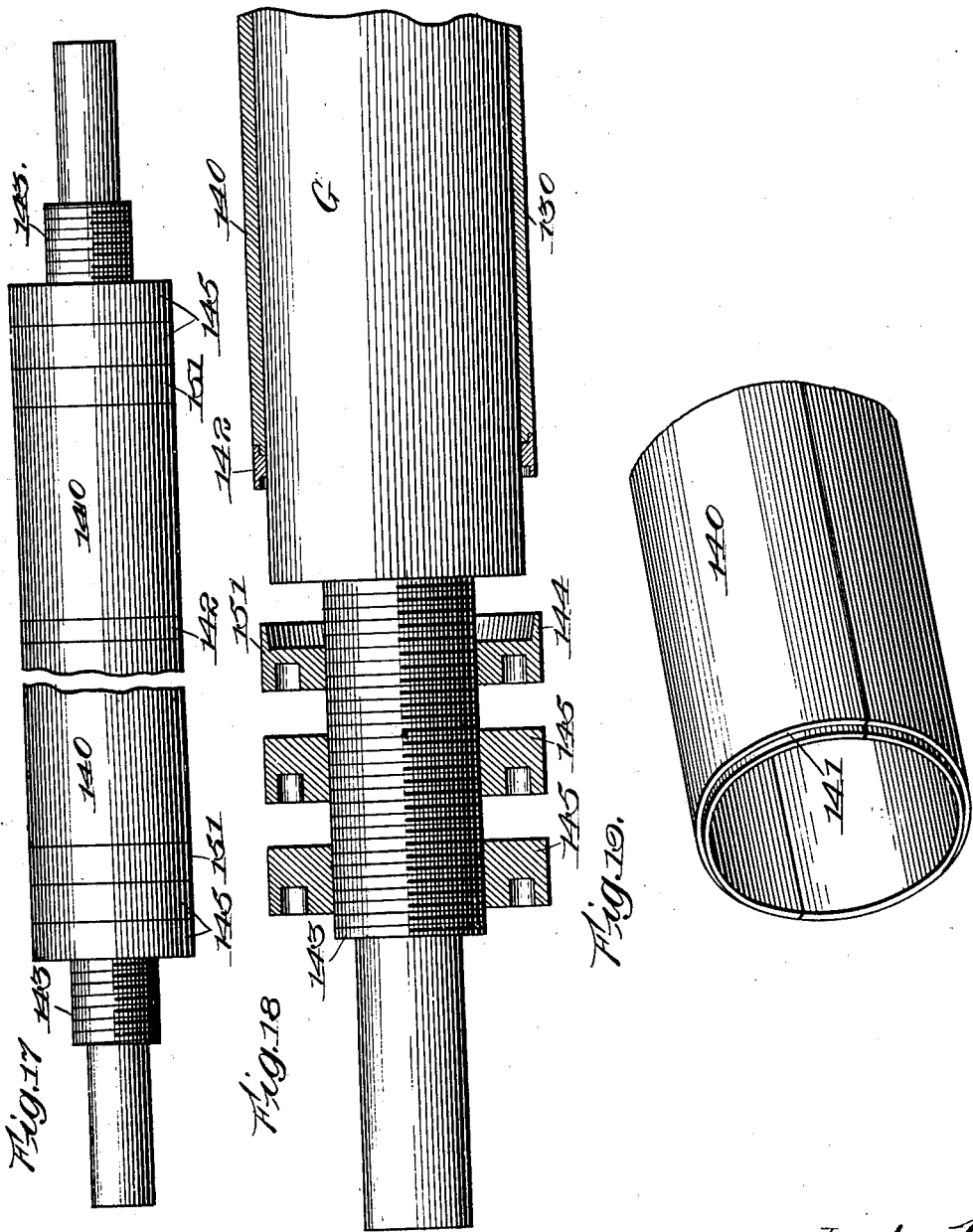

UNITED STATES PATENT OFFICE.

ENGLAND J. BARKER AND MATTHEW J. BARKER, OF MORGAN PARK, AND FRANK B. LA BARR, OF CHICAGO, ILLINOIS; SAID MATTHEW J. BARKER AND FRANK B. LA BARR ASSIGNORS TO SAID ENGLAND J. BARKER.

PRINTING-PRESS.

992,146.  Specification of Letters Patent.  Patented May 16, 1911.

Application filed March 16, 1904. Serial No. 198,468.

*To all whom it may concern:*

Be it known that we, ENGLAND J. BARKER and MATTHEW J. BARKER, citizens of the United States, residing at Morgan Park, Cook county, Illinois, and FRANK B. LA BARR, also a citizen of the United States, and residing at Chicago, Cook county, Illinois, have invented certain new and useful Improvements in Printing-Presses, of which the following is a full, clear, and exact description.

Our invention relates to web perfecting printing presses, and particularly to a press for printing on a continuous web of paper small circular work, or the continuous strips or records used in autographic registers, or other similar small work of a width that permits of several either of the same or different jobs of work to be printed side by side on the web of paper as it passes through the machine. Heretofore work of this character has not been printed by large web perfecting presses because the size of the type cylinder required stereotype segments of such circumference that several of the said circulars or record units in tandem order would have to be set-up to make a surface sufficient in length to extend around the circumference of said cylinder, and the labor of doing this, as well as that involved in the "make-ready" work on a large web perfecting press, especially on jobs of the size of the small work, the printing of which it is the object of our invention to do, would render it unprofitable. This small work has been done on a continuous web of paper that is fed from a continuously revolving supply roller, by job presses that have a flat bed and platen, but in order to hold the paper stationary during the interim of time it is receiving an impression, it is provided with means for causing the web to sag before it reaches the platen, and for taking up the slack thus created. This greatly detracts from the speed of the machine, and it is the object of our invention to overcome this objection and reproduce for small work the action of large web perfecting printing presses at a greatly reduced cost both in the material and labor involved. This we accomplish in a comparatively simple manner, by the employment of anomalously small type-cylinders and impression rollers not exceeding as a rule, more than six inches in diameter, and by solid cylindrical stereotype shells, the circumference of which is just sufficient for a "set-up" capable of printing one circular or record unit with each revolution thereof, and by punching mechanism that perforates the paper while moving in the same direction therewith and at the same speed, and by other means hereinafter fully described, and as particularly pointed out in the claims.

In the drawings, Figure 1 is a side elevation of a printing press embodying our invention. Fig. 2 is an elevation of the opposite side of the same with a portion of the outstanding framework broken away in order to better illustrate the adjacent operative mechanism of the machine. Fig. 3 is a front elevation of said printing press. Fig. 4 is a plan view of the same. Fig. 5 is a vertical longitudinal section of said machine, taken on dotted line 5—5, Fig. 3, looking in the direction indicated by the arrows. Fig. 6 is a side elevation of the upper portion of the side-frame of the machine, looking at the inner surface of the same. Fig. 7 is a diagrammatical view illustrating the means for separating the print or type and impression rollers of the machine. Fig. 8 is a detail view showing a section of the bearings of one of said rollers, taken on dotted line 8—8, Fig. 7. Figs. 9 and 10 are detail views illustrating the punching mechanism in different positions. Fig. 11 is a side view of the draft roller separated from the numbering mechanism of the press. Fig. 12 is a plan view of a portion of the machine including the numbering rollers and coöperating rollers adjacent thereto. Figs. 13 and 14 illustrate details of our invention. Fig. 15 is a side view, on a larger scale, of a portion of the machine with the gearing on the adjacent ends of shafts projecting through their bearings removed. Fig. 16 is an edge view of what is shown in Fig. 15, with the flanges of the adjacent edge thereof broken away. Fig. 17 is a detail view showing a side elevation of a type-cylinder embodying a novel feature of our invention. Fig. 18 is a longitudinal central section of certain portions thereof drawn to a larger scale. Fig. 19 is a detail on enlarged scale showing a section through a stereotype retaining ring and broken away end portions of the stereotype shells engaged thereby.

In the drawings, A, A, represent the lower portion of the side-frames of the press, and A', A', represent the upper portions of the same. It would avail nothing to attempt to describe in detail the shape of these side-frames; it is sufficient to say that they are designed to furnish the necessary support for and to facilitate the assembling of the parts of the machine, and to the extent to which the same are made the subject of special construction will be hereinafter fully explained in conjunction with the particular mechanism to which such special construction has relation.

B represents the supply-roller of the machine upon which the roll of paper is mounted from which the continuous web is furnished that is threaded through the machine, and printed on one or both sides, numbered, punched, and slit, as desired. The journals of this roller have bearings in the open bearings, B', B', made in one end of the lower portion, A, A, of the side-frames. The entrance into these open bearings extends horizontally from the end edges of the said frames, which latter are, preferably, provided with integral skids, $a$, $a$, down whose inclined upper edge the journals of said roller will roll when the retaining bearing-blocks $a'$ are removed from the entrance of said bearings B', when the pins $a^2$ are withdrawn, substantially as shown. The opposite ends of the side-frames are provided with similar bearings C, and are provided with the integral skids C' for the accommodation of the journals of the receiving or delivery rollers D of the press.

One end of the journal of the supply-roller B is extended beyond its bearings, and has a suitable grooved wheel $1^B$ thereon, which is engaged by the bifurcated end of the longer arm of a horizontally disposed L-shaped lever $2^B$. This lever is fulcrumed to a suitable bracket projecting from the adjacent side-frame of the machine, away from whch the shorter arm of the lever extends, which latter has a tapped lug $3^B$ arising therefrom, through which the screw-threaded rear end of a rod $4^B$ passes. This rod extends through a suitable guide-lug $5^B$ projecting from the side-frame A, to the front of the machine, where it is provided with a hand-wheel $6^B$. By suitably manipulating wheel $6^B$, lever $2^B$ is moved so that it will, through the medium of the grooved wheel $1^B$, shift the supply-roller B longitudinally and bring it into such position that the web of paper fed therefrom will run parallel with the side-frame through the machine. From roll B the web of paper extends to and between an idle roller $b$ and a draft-roller $c$, and from thence to the first set of printing rollers, to which a more extended reference will hereinafter be had. The draft-roller $c$ is provided with a compound spiral groove $d$, which commences at the ends of the roller and extends in opposite directions spirally around the roller until they reach approximately the center of length of the same where they meet and form an angle, substantially as shown in Fig. 11 of the drawings. The object of this construction is to enable the roller to draw the web of paper from the supply roller, and, at the same time, by reason of the groove $d$, keep brushing (as it were) the paper outward toward its side edges, and thus draw the paper taut and smooth to and around the idle-roller $b$, preparatory to its being fed to the first set of printing rollers. We prefer to journal the ends of the shaft of the draft-roller $c$ in the arms $e$, $e$, which are pivoted to the side-frames at points on the side of said roller $c$ farthest from the supply-roller B, and have their opposite ends extend past the bearings of roller $c$ toward the roller B and pivotally connected to the upper end of vertically reciprocal rods E. These rods are of such length that they extend to near the base of the machine where they have their said lower ends crooked or looped around the eccentric bosses E' secured to rock-shaft $E^2$, which latter is journaled in bearings in the side-frames and has one of its ends extended through its bearings and provided with a lever $F^2$ by means of which it is rocked. When the lever F is properly manipulated the rods E will move downward and by simultaneously moving arms $e$ will cause the roller $c$ to be carried out of contact with the roller $b$. In order to automatically return the draft-roller $c$, to its normal position in contact with roller $b$, the rods are passed through lugs $c'$ projecting inward from the side-frames, and are surrounded by a coil-expansion spring $e'$ above said lugs $c'$, which are sufficiently depressed upon said lugs by the thumb-nuts $e^2$ engaging the threaded portion of said rods, substantially as shown in Fig. 5.

The course which the web of paper takes after passing around roller $b$ is back over itself for a short distance until it passes to and between the impression-roller F and the type-cylinder G. Both the impression-roller and type-cylinder, F and G, are, respectively, journaled in bearing-blocks $f$ and $g$, the sides of which are provided with longitudinal grooves, and are both seated and adapted to be adjustable longitudinally in a rectangular and longitudinally elongated guide-way or opening $h$, made in the lower rear portion of the upper part of the side-frame A', and extending in an upwardly and forwardly inclined direction from the edge of said portion of the frame, substantially as shown in Fig. 6. The entrance to this opening is normally closed by a plate H one end of which is secured by a bolt to the outer edge of that portion of the side-frame in which said opening is made, and the other end of which is secured, by means of a bolt that passes through a transversely disposed opening, in such manner that, when the latter bolt is loosened, said plate can be swung laterally until the said opening is uncovered. The plate H has, in the portion bridging the mouth of the opening, a bolt I passing therethrough longitudinally and centrally into said opening. This bolt is secured to the outer end of the bearing-block g in which the type-roller is journaled, so that, by properly manipulating it, the bearings and the type-cylinder can be moved away from and out of contact with the impression roller. This is desirable when it becomes necessary to remove said type-cylinder. It oftener becomes necessary to throw the impression-roller out of contact with the type-cylinder than vice-versa. This we accomplish by journaling a rock-shaft i in bearings in the side-frame located just beyond the end of the guide-ways h. The rock-shaft is provided with an eccentric extension j to which is secured an arm k, which latter, at its end farthest from the said extension j, has pivotally connected to it the adjacent end of the connecting-rod K, whose other end is pivotally connected to the shorter arm of the crank L. The eccentric extension j extends through a suitable opening in a longitudinal shield l, extending from the bearing-block f, so that, when the shaft i is turned the block f will be reciprocally moved in the opening h, in a direction away from the type-cylinder.

The type-cylinder G is inked by a train of ink-rollers, that draw their supply from a suitable ink-fountain, and have motions of the most approved kind for the thorough distribution and proper application of the ink to the type. These inking-devices comprise two rollers J', J', which are in contact with the roller G on the side thereof opposite roller b. These rollers are separated a distance less than their diameter, and are respectively journaled in the ends of suitable bars m, m', which are fulcrumed to the adjacent surface of the side-frame by suitable bolts, and can be adjusted by properly manipulating the gage-screws M, M', shown in the drawings, so that the positions of the ink-rollers J' may be changed, according as required, by the adjustment of cylinder G to or from roller F, so as to always be maintained in contact therewith. This method of journaling the ink-rollers, J', J', is also rendered necessary in order to permit the removal of the type-cylinder, and its bearings from the opening h, whenever a new stereotype shell is to be mounted on said roller. These rollers J', J', revolve through frictional contact with the type-cylinder G, and the longitudinally-vibratory ink-roll N derives its motion from them. One end of the journal of the printing-roller extends through its bearings, and is provided with a pinion G' which is actuated by a similar pinion F' secured to the adjacent extended journal of the impression-roller, which latter derives its motion from the idle-gear O. This idle-gear O is loosely journaled on a suitable stud O' which is adjustably secured in a laterally elongated slot o in the side-frame, which is struck from the center of the drive-shaft of the machine by the pinion p on whose end the idle-gear O is driven.

The journals of the vibratory-roller N extend through suitable bearings in the side-frames, and the end of the journal thereof opposite that on which the gears G' and F' are secured has a suitable channeled wheel N' thereon. The vibratory-roller N is vibrated back and forth by means of a horizontally disposed lever Q, which is pivoted at about its center of length to a suitable bracket q secured to and projecting from the adjacent side-frame of the machine, and has a stud arising from one end which enters the circumferential channel of said wheel N', and has projecting up from its opposite end a similar stud that engages the oblique runway r of the cam R, the construction and operation of which will hereinafter be more fully described.

The support for the inking-fountain consists of a metal-frame that has end extensions that reach beyond the end-walls S of the same and are secured to the side-frames. The said end-walls S have bearings therein adjacent to the series of rollers fed thereby, for the supply-roller T, which takes up the initial supply of ink from the fountain. The ends of said end-walls S, opposite said roller T, are connected by a longitudinal platform s, which inclines from the side of the fountain farthest from the roller (T) down toward the underside of the same to about the center of the width of the fountain, whereupon the lowermost side edge of said platform is bent downward to form a drop-wall s' that depends a suitable distance below the plane of said roller T. Secured to the uppermost side of platform s, by a suitable strip $s^2$ is a metal plate bottom U, which rests upon the said platform, and is of sufficient width to extend under and contact with the underside of roller T. The adjacent edge of said bottom plate is held in contact with roller T, and the pressure thereof against said roller is graduated by means of a series of triangular shaped blocks t, which, like a bell-crank, have an angle pivoted between suitable lugs projecting forward as shown from the upper portion of the drop-wall s'. The blocks are of such dimensions that one of their two unpivoted angles will bear upward against the underside of the edge of said bottom U below the roller T, and the other bear against the drop-wall near its lower edge. Thumb-screws $u$ are tapped through drop-wall $s'$, and bear against the rear vertical edges of these blocks, and by means of these screws $u$ said blocks can be respectively adjusted to press the bottom U of the fountain against roller T, to absolutely control, at any point along its length, the amount of ink on its circumference it is desired.

Roller T has the journal on the end thereof nearest which the paper is supplied to the machine, extended through its bearings, and has an upwardly projecting arm $T'$, loosely mounted thereon, and beyond this arm has a ratchet $v$ secured thereto. Arm $T'$ has a back and forth oscillatory movement, and imparts its movement, when moving toward the rear of the machine, to the ratchet wheel $v$, through the medium of a weighted pawl V, which latter is pivotally connected thereto, as shown. Arm $T'$ is connected by means of a suitable link $w$ to an arm W, and the opening in the link $w$ through which the pivot-bolt connecting arm $T'$ thereto passes is elongated longitudinally to permit of the proper relative adjustment of the arm W to arm $T'$. Arm W is secured to the rock-shaft X whose ends are journaled in the side-frames of the machine a suitable distance below the roller $T'$, and has, near its bearings opposite arm W, an arm $W'$, projecting in the same direction as arm W, that is of about one-half the length of the same. Journaled in the end of this arm $W'$ and in arm W at about its center of length is an inking-roller Y which is adapted to be carried back and forth from roller T to the roller N to transmit the ink from the former to the latter. The journal of the shaft X extends through its bearings in the side-frame of the machine nearest which the arm W is situated, and has secured at its outer end a vertically disposed arm $x$, which is connected to an eccentric $y$ on the same shaft upon which the cam R is secured, through the medium of a suitable ring 2 and connecting-rod 3, which connects said ring to the end of the arm $x$. The movement obtained through the agency of this eccentric is sufficient to cause the back and forth operation of the ink-roller Y, and intermittent movement of the roller T, as hereinbefore described.

After the web of paper has passed between the impression-roller F and the type-cylinder G, it extends to and around another impression-roller 4, located above and slightly to the rear of roller F. In the event of the machine being used to print but one side of the paper, the latter extends to and around the impression roller 4 from right to left, but, in the event of the machine being used to print on both sides of the paper, said web extends to and passes around roller 4 from left to right, substantially as hereinafter more fully explained. This impression-roller 4 is journaled in bearing-blocks 5, which are adjustable longitudinally in the elongated guide-ways 6, and the latter are recessed down into the upper portions $A'$ of the side-frames, and extend downward from the mouths thereof at substantially the same angle as guide-ways $h$. Engaging and coöperating with impression-roller 4 is a type-cylinder 7, the ends of which are journaled in bearing-blocks 8, likewise adjustable longitudinally in guide-ways 6. The ends of these rollers 4 and 7, on the side of the machine adjacent to the means for effecting the throw-off of the impression-roller F, extend through their bearings and are geared together through the medium of the corresponding pinions 9 and 10. Pinion 9 is secured to the extended end of the journal of the impression-roller, and engages and is actuated by the idle-gear 11, which derives its motion from the pinion $p$ on the adjacent end of the drive-shaft of the machine. Idle-gear 11 is journaled on a spindle 101 that is adjustably secured in a longitudinally elongated opening 102 in the upper end of a vertically elongated frame 103, which latter is pivoted to the side-frame of the machine at its lower end, and at about its center of length has a laterally elongated opening 104 out through which a stud 105 projecting from said side-frame projects. This stud 105 is screw-threaded and has nuts thereon by means of which frame 103 can be clamped and held fast in any laterally adjusted position to which it may be adjusted within the limits of opening 104. Now, when the web of paper is passed between the type-cylinder 4 and impression-roller 7 from right to left, the spindle on which idle-gear 11 is journaled is adjusted to the lowest limits of opening 102 in frame 103 so as to bring the idle-gear into engagement with gear 9 of the impression-roller 4, but if it is desired to run the web of paper from left to right (as where said web is to be printed on both sides), spindle 101, carrying gear 11 is moved up toward or into the upper end of slot 102 so as to bring said gear into engagement with the pinion 10, of the type-cylinder 7. The means for carrying and adjusting the position of the idle-gear are also necessary in view of the adjustment of the said type-cylinder and impression-roller to and from each other.

In view of the fact that the disengagement of both impression-rollers F and 4 from their respective coöperating type-cylinders should be simultaneous, the same means are employed to accomplish this result for both said rollers. It has been stated that a crank L and rod K are used to turn the shaft $i$, with its eccentric extension $j$, to effect the "throw-out" of impression-roller F. The pivot of this crank L is the eccentric extension 12 on the adjacent end of the rock-shaft 13, which, as heretofore stated, is journaled in suitable bearings in the side-frames located slightly beyond the closed ends of guide-ways 6, substantially as shown in the drawings. The extensions 12 extend through suitable openings in an extension of a face-plate 14 secured to the outer surface of the adjacent bearing-block 5, and when the crank L is properly moved, the bearing-blocks 5, as well as the bearing-blocks $f$, are moved so as to carry the impression-rollers away from the type-cylinders. The bearing-blocks 8 of the type-cylinders 7 are adjustably secured in place by means of a bolt 15, which is tapped through a pivoted plate 16 that bridges the open end of the guide-way 6, substantially the same as plate H and bolt I control the adjustability and removability of blocks $g$.

The means for supplying ink to the type-cylinder of the roller 7, comprise an ink-fountain 107, and a series of rollers arranged and operating with reference to the fountain and said type-roller, substantially the same as those used in connection with the type-roller G and its ink-fountain. The ink-fountain 16 consists of an inclined platform, a flexible sheet-metal plate bottom, and the blocks and gage-screws for adjusting said bottom, the same as the ink-fountain hereinbefore described, and there is an intermittent roller 17 against which the said flexible bottom is pressed; an oscillating transmitting roller 18; a vibratory roller 19; and the adjustable rollers 20 and 21, that distribute the ink upon the type-cylinder. Like roller T, the roller 17 has one of its journals extended through its bearings and has an arm 22 loosely mounted therein which is similar to arm T'. This arm 22 is connected by link 23 to the oscillating arm 24, and carries a pawl 25, which engages a ratchet 26 secured to the extended end of the journal of roller 17, and thus imparts movement thereto when moving from right to left, substantially as shown in Figs. 2 and 5 of the drawings. The oscillating arm 24 is of an obtuse angle shape and is secured to and projects in an upwardly direction from a rock-shaft 27, the ends of which are journaled in the side-frames of the machine. This rock-shaft has an arm 28 opposite the end near to which arm 24 is secured and the transmission-roller 18 is journaled in or near its extremity and in bearings located at about the angle of arm 24. The journal of shaft 27, nearest which arm 24 is located, extends through its bearings, and next the outer surface of the side-frame is provided with a comparatively short arm 29, which projects in a horizontal direction, and, through the medium of a vertically disposed connecting-rod 30, is connected to and actuated by the ring 2 of the eccentric $y$, hereinbefore alluded to. The vibratory-roller 19 is operated in the same manner as the vibratory inking roller N used in connection with the type-cylinder G, that is, it has its journal extend through its bearings in the frame of the machine nearest which the actuating mechanism of arm 24 is located, and has a channeled wheel 31 thereon, and engaging this wheel is a friction-roller or stud 32 projecting from the adjacent end of a vertically disposed rock-bar 33. The rock-bar 33 is fulcrumed about its center of length, and its lower end has a friction-roller or stud 34 entering the oblique groove $r$ of the cam R, which oscillates it.

From the impression-roller 4 and type-cylinder 7, the web of paper, after it has passed between them from right to left (as viewed in Fig. 5), extends to and around a guide-roller 35 located below and in the vicinity of the drive-shaft P, and from thence it extends to and around the impression-roller 36, and between the same and the numbering-head cylinder 37, the detailed construction of which latter will be more fully described hereinafter. Suffice it to explain that this roller 36 and cylinder 37 are journaled in bearing-blocks 38 and 39, respectively, that are adjustably retained in the guide-ways 40, (which latter are recessed into the upper edges of the upper portion of the side-frames A' and extend at about the same angle as guide-ways $h$ and $g$) by the same means employed for this purpose in connection with the bearing-blocks of roller F and cylinder G.

The cylinder 37 carrying the numbering-heads 41 are provided with several longitudinal grooves 42, and the numbering-heads (which are similar in construction and operation to those now in extensive use in printing and book-binding machinery) are adjustable longitudinally in these grooves so as to print on the web of paper at any point desired in the direction of its width, and at points a suitable distance apart in a longitudinal direction, dependent upon the number and location of the grooves 42. As is well-known in the printing-art, the numerals in numbering-heads are advanced in numerical order by said heads coming in printing contact with the impression-cylinder. Now, if it is desired to advance these numerals two at a time, so that the impressions made by any one of them on the web of paper will be, say 1, 3, 5, 7, etc., or 2, 4, 6, 8, etc., it will be necessary for them to come in contact with another actuating cylinder, in addition to its contact with impression-roller 36. This we accomplish by the employment of one or more contact-cylinders 43, which are mounted and adjustable longitudinally on shaft 44, so as to bring them into such position that the numbering-heads will, during each revolution of the cylinder 37, impinge against its periphery and its numeral type advanced in the manner stated. The shaft 44 is journaled in the ends of blocks 45, which are secured to the side-frames A' in such manner that they can be moved transversely to its own axis to and from cylinder 37. This movement is caused by a transverse-shaft 46, whose ends are journaled in the side-frames A', and which has the portion passing through suitable openings in the blocks eccentric. This shaft, 46, has arms 47 near its ends projecting therefrom toward shaft 44, and the ends of these arms are connected by links 48, to ends of corresponding arms 49 projecting down from near the ends of rock-shaft 50, which latter is journaled in bearings near the bottom of the guide-ways 40. The ends of shaft 50 extend beyond their bearings and are reduced to eccentric extensions, which pass through the adjacent ends of plates 51 secured to and projecting longitudinally from bearing-block 38. One end of shaft 50 has a lever 52 projecting therefrom, and, when this lever is moved in the proper direction, impression-roller 36 is bodily moved out of engagement with the numbering-heads carried by cylinder 37, simultaneously with the contact-cylinders. The inking devices for said numbering-heads is, except in the matter of their relative position, the same in construction and operation as those employed in connection with the type-cylinders G and 7. Without entering, therefore, into a detailed description of them, it is sufficient to say they consist of an ink-fountain 53, having an intermittently revolving feed-roller 54, the delivery-roller 55 journaled in the oscillating arms 56, and carrying ink from roller 54 to the vibrating-roller 57; the equalizing roller 58, and the adjustable distributing-roller 59, from which latter the numbering-heads receive ink. The intermittently revolving roller 54, is actuated in the same manner as roller T indirectly through the medium of the ratchet 60, which is journaled on its extended end, which is engaged by the pawl 62 carried by arm 63, which latter is loosely mounted on the journal of roller 54 and is connected to arm 56 by the link 64. Outside of its bearings at one end, the shaft 65, from which arms 56 project, has an arm 66 projecting in the opposite direction, and this arm is connected by link 67 to the lug 68 projecting radially from the eccentric ring 2. The vibrating roller 57, in manner similar to the other vibrating rollers of the machine, has one of its ends extend through its bearings and provided with a channeled wheel 69, and is vibrated by means of a lever 70, which is fulcrumed about its center of length, and has a stud projecting down from its uppermost end that enters the circumferential groove in the channeled wheel, and a similar stud projecting down from its lowermost end that enters the oblique groove $r$ in the cam R.

After passing between the impression-roller 36 and the cylinder 37 the web extends to and over a guide-roller 71, and then in an almost vertical plane downward to and over the guide-roller 72, and from thence to the receiving-roller D. Between the guide-rollers 71 and 72 the web of paper is punched and slit. The punching mechanism is so constructed that the punches operate while moving in the same direction and at about the same speed as the web of paper. This we accomplish by employing two corresponding gears 74 and 75, the spindles of which are journaled in suitable bearings in the side-frames A', in such position that an imaginary straight line intersecting their axes will be about at right-angles to the course of the web of paper. The gear 74 has one of its ends extended through its bearings in the side-frames of the machine and provided with a gear 76, which, indirectly through the idle-gear 77, derives motion from gear 78 on the extended end of the impression-roller 36, which latter, through the medium of the idle-gear 79, is driven by the pinion $p$ on the drive-shaft P of the machine. Pivotally connected by means of a suitable bolt and nut 80, at a suitable point from the center of the inner faces of these gears 74 and 75, are suitably shaped hanging-frames 81 and 82, which, preferably, correspond in shape, and are arranged so that those (81) pivoted to gears 75 are in a position the reverse of those (82) connected to gears 74. The pendent portions of these hangers 81 consist of an oblong block, and the portion of said hangers normally above their pivots may be aptly described as "lugs" and have a series of arbitrarily disposed pivot-openings therein, any of which may be engaged by the pivot-bolt 80, according to the relative position it is desired said hangers should occupy, when said mechanism is being assembled. The ends of the oblong-blocks of the hangers (viewing the same as shown in Fig. 9 of the drawings), farthest from each other have bearings therein for shafts 83 and 84, respectively; the shaft 83, connecting the hangers 81 on opposite sides of the machine, and the shaft 84 connecting the opposite hangers 82. Secured to shafts 83 and 84, next their bearings at each end, are corresponding guide-blocks 85 and 86, and in the guide-block 85, one end of a piston 109 is secured by suitable nuts, which extends through and reciprocates in the guide-blocks 86, as said gears 74 and 75 revolve, and keep said shafts 83 and 84 in the same relative position to each other, all the time, or, in other words, so that they do not have any independent revolution in their bearings. Mounted and adjustable longitudinally upon shafts 83 and 84, and secured thereto by the set-screws 87 and 88, are annular die-stocks 89 and 90. The set-screws are tapped horizontally into the sides of the stocks 89 and 90, farthest from each other, and diametrically opposite these set-screws and so that their centers will aline with an imaginary straight line intersecting the axes of shafts 83 and 84, dies or punches 91 are inserted and secured in suitable cylindrical bosses projecting from the stocks 89, and companion female dies 92 are secured in suitable alining cylindrical bosses projecting from stocks 90. During each cycle of movement of the gears 74 and 75, the dies 91 and 92 will engage, as shown in Fig. 10 of the drawings, and while traveling in the same direction, thereas, will punch the necessary holes in the web of paper, no matter how rapidly the latter moves. An important feature of these dies resides in the V-shaped groove made in the engaging end of the male die 91. By virtue of this construction, when said die enters the corresponding opening in the female die 92, it does not push an opening through the paper, but cuts it out clean and round.

In order to prevent the possibility of torsional strain on shafts 83 and 84, and the hanging frames 81 and 82, we have journaled an idle-shaft 110 in the side-frames, and secured pinions 111 thereon, which engage the gears 74 at each side of the machine. This prevents the possibility of the torsional strain asserting itself.

The slitting of the web of paper into strips of the desired width is accomplished by means of cutting disks 93, which are adjustably mounted on the shaft 96. The ends of shaft 94 are journaled in the side-frames of the machine, and one end thereof extends through its bearings and has a sprocket wheel 97 thereon, which is engaged by a chain belt 98, which latter derives movement from a sprocket-wheel 99 on the contiguous end of the drive-shaft P. Shaft 96 is connected by a universal joint or gimbal 100 to a spindle $1^a$, which is journaled in the side-frame A' and extends through its bearings and has a pinion $1^b$ on its outer end that is engaged and derives motion from a corresponding pinion $1^c$ on shaft 94, between the sprocket 97 and its bearings. Shaft 96 is maintained in a perfectly horizontal position by corresponding arms $1^d$ which project from bosses $1^e$ secured to and longitudinally adjustable on stationary-shaft $1^f$, the ends of which are suitably secured in the side-frames of the machine. The ends of these arms $1^d$ farthest from shaft $1^f$ are bifurcated and these bifurcations have openings in them for shaft 96 to pass through, and between these bifurcations the cutting disks 95 are mounted. Shaft 96 is, preferably square in cross-section, and the opening in the disks 95 through which shaft 96 passes are, therefore, likewise square. The manner of connecting shaft 96 to its spindle $1^a$, and the maintaining it in a horizontal position, by the arms $1^d$ causes the disks 95 to have a tendency to drop toward shaft 94 and at the same time longitudinally, and thus keeps the cutting edges of disks 93, and improves the cutting contact therewith. Now, if, as hereinbefore stated, it is desired to print on both sides of the web of paper, after it passes between type-cylinder G and impression-roller F, it extends to and passes between type-cylinder 7 and impression roller 4 from left to right. It then extends, in a horizontal plane to and around guide-roller $1^g$; then vertically upward to and around guide-roller $1^h$; then horizontally forward to and around guide roller $1^k$, and then to and around guide-roller 35, substantially as shown in dotted lines in Fig. 5 of the drawings. When threading its way through the machine in this manner the web of paper is printed on one side when passing between type-cylinder G and impression-roller F, and on the opposite or other side when passing between type-cylinder 7 and impression-roller 4.

The end of drive-shaft P extends through its bearings on the side of the press adjacent to the eccentric $y$ and cam R, and has a pinion 113 just outside its bearings that engages and drives the gear 114 secured to the shaft 115 on which said eccentric and cam are mounted. The outer end of the drive-shaft P is journaled in suitable bearings in a suitable auxiliary frame or standard $1^m$ and has a fly-wheel $1^n$ on the extremity thereof beyond said last mentioned bearings. Between the side-frame and said standard shaft P has a fast and loose pulley 116 and 117 thereon, and next these pulleys it is provided with the sprocket wheel 99. This sprocket-wheel 99 is connected to the sprocket-wheel 118 by the chain-belt 98, which latter engages and drives the sprocket 97 as it moves past the same and is kept in engagement therewith by a belt-tightener consisting of a channeled or concaved roller, loosely journaled on a projecting stud on the end of an adjustable arm 119, substantially as shown. Sprocket-wheel 118 is secured on a shaft 120, between two disks 121 and 122, whose bosses surround shaft 120 like sleeves. These bosses are loosely journaled in suitable bearings in a supporting-frame 123 and the one extending toward side-frame A has a gear 124 thereon that meshes with a gear 125 on the adjacent end of the receiving roller D. The boss of the disk farthest from the side-frame A of the press is engaged by an expansion spring 126 surrounding the end portion of shaft 120 beyond said boss, and the pressure of the latter is regulated by the nut 127 on a screw-threaded part of said shaft. The pressure of the expansion-spring causes disks 121 and 122 to clutch the sprocket so tight that it imparts its motion to them, and, through the medium of gear 125, to the receiving roller. The object of this method of imparting motion to the receiving-roller is to enable the latter when it has increased in size to such an extent that it will wind up the web of paper faster than said web is delivered from the press, to resist the friction between the sprocket and the friction disks, and thus compensate for the difference in speed.

The type-cylinders used in our improved press are surrounded by perfectly tubular stereotype shells 130 that seldom exceed six inches in diameter, and as a result of long and costly experience we have ascertained, what we have been informed, is an anomaly in the printing art, namely; that a type-cylinder of this diameter can be practically employed, providing an impression-roller of the same diameter be used in conjunction therewith. Heretofore, small type-cylinders of approximately this diameter have been used in conjunction with large impression rollers, but the cost and delay incident to the "make-ready" have been so great as to render such a combination impracticable, especially for small work. In a press, such as that under consideration it is necessary, especially with the first set of printing rollers to not only make their bearing adjustable transversely to its own axis in their guide-ways, but to make them individually adjustable longitudinally, or in the direction of their axes. This we accomplish by a T-shaped bracket 131, the shorter 132 of whose alining branches has an opening therein through which the reduced extension of the journal of impression roller F passes, and the end of whose longer alining branches is bifurcated and passes on each side of the reduced extension of the journal of type-cylinder G, so as to permit of said roller and cylinder to be adjusted or moved to or from each other. The extremity of the trunk branch 135 of this bracket farthest from branches 132 and 133, is provided with a transverse slot 134 therein and is mounted on a threaded stud 136 projecting from the side-frame of the machine, and is maintained thereon in any position to which it may be adjusted by nuts 137 and 138 the outermost one of which is provided with a hand-wheel with which to manipulate it. Now, these nuts 137 and 138 are loosened up when it is desired to adjust cylinder F and roller G longitudinally, and when the latter are adjusted to the position desired, the bracket, whose arms 132 and 133 are between the shoulder made by reducing the diameter of the extensions of the journals of the type-cylinder, and impression-roller and the gears F' and G' is likewise moved in the stud 136, and then locked in such adjusted position by the nuts 137 and 138, thus maintaining the roller and cylinder in their longitudinally adjusted position.

In order that, when printing several corresponding record strips, side by side, at the same time, it may not be necessary to "set-up" more than one form, we divide the sterotype shells 130 into several sections each of which are struck from the same form, the sum of whose total length will corresponds to the entire length of the type cylinder. Each of these sections is composed of two semi-circular plates, 140, corresponding in curvature to that of the circumference of the type cylinders G and 7, and the end edges 141 of these plates are rabbeted and made not more than half as thick as the body thereof. Now these semi-circular plates are arranged in pairs on the type-cylinder with their longitudinal edges touching and thus completely surrounding said cylinder, and with their end edges in the same transverse plane. In this position these plates are secured together and at the same time secured to the type-cylinder by means of rings 142 which have their inner edges rabbeted to such an extent as to enable them to lap over the outer rabbeted ends of said plates. There are as many of these pairs of plates placed on the type-cylinder as may be necessary to cover the same from end to end, and there is one of the rings 142 placed between the end edges of each adjacent pair of said plates and one at each end of the series of pairs, and they are clamped together in this position. The means for accomplishing this clamping comprise a washer 151 which is mounted on the reduced screw-threaded end portion 143 of each end of the type-cylinder, which is of a diameter slightly greater than said cylinder and has a circumferential flange 144 projecting laterally therefrom whose inner circumference is such as to enable it to lap past and extend over the adjacent end edge of the cylinder and engage the end ring 142. This washer is engaged by the nuts 145 and 145, and made to press endwise against said rings and plates 140 and clamp them together and hold them securely on the type-cylinder.

In order to assist in retaining the web of paper in a given position as it pursues its course through the machine, we prefer to use, either with or without the means for adjusting the supply-roller B longitudinally, a hanging guide-frame which consists of two corresponding links 146, 146, the upper ends of which are loosely mounted on shaft X near its bearings, and the lower ends of which are connected by a non-revoluble shaft 147. The distance between the center of shaft X and shaft 147 corresponds, preferably, to the distance between the centers of shaft X and the supply roller. Shaft 147 has rollers, 148, 148, thereon which have a circumferential flange 149 on the end thereof nearest the links and are held in position, the one rolling on one side edge of the supply-roller with its flange bearing laterally against the same, and the other in similar manner on the opposite side of the roll by nuts 150, 150. These rollers can be adjusted to any position desired on shaft 147, and will automatically prevent lateral movement of the supply-roller altogether when the latter is once adjusted in its proper position.

What we claim as new is:—

1. A printing press comprising a type-cylinder and its companion impression-roller, a revolving numbering-head and its companion impression-roller, a rotary punching mechanism the engaging ends of the dies of which constantly face each other, and revolving slitting disks.

2. A printing press comprising a primary type-cylinder, and its companion impression-roller, a secondary type-cylinder and its companion impression-roller, a revolving numbering-head and its companion impression-roller, a rotary punching mechanism the engaging ends of the dies of which constantly face each other, and revolving slitting disks.

3. A printing press comprising an adjustable primary type-cylinder and its companion impression-roller capable of revolution in but one direction, an adjustable secondary type-cylinder and its companion impression-roller adapted to be revolved in either direction, a revolving numbering-head and its companion impression-roller, a rotary punching mechanism the engaging ends of the dies of which constantly face each other, and revolving slitting disks.

4. A printing press comprising a primary type-cylinder and companion roller therefor adjustable transversely to its own axis and capable of revolution in but one direction, a secondary type-cylinder and companion roller therefor adjustable longitudinally and adapted to be revolved in either direction, a revolving numbering-head and its companion impression-roller, a rotary punching mechanism, and revolving slitting disks.

5. A printing press comprising a separable primary type-cylinder and companion roller therefor adjustable transversely to its own axis and capable of revolution in but one direction, a separable secondary type-cylinder and companion roller therefor adjustable longitudinally and adapted to be revolved in either direction, a revolving numbering-head and its companion impression-roller, a rotary punching mechanism, and revolving slitting disks.

6. A printing press comprising a separable primary type-cylinder and companion roller therefor adjustable longitudinally and capable of revolution in but one direction, a simultaneously separable secondary type-cylinder and companion roller therefor adjustable longitudinally and adapted to be revolved in either direction, a revolving numbering-head and its companion impression-roller, a rotary punching mechanism, and revolving slitting disks.

7. A printing press comprising a type-cylinder and companion impression-roller therefor, a revolving numbering-head cylinder and companion impression-roller therefor, a contact-cylinder for said numbering-heads, a rotary punching mechanism the engaging ends of the dies of which constantly face each other and revolving slitting disks.

8. A printing press comprising a type-cylinder and companion impression-roller therefor, separable revolving numbering-head cylinder and companion impression-roller therefor, a contact-cylinder for said numbering-heads, a rotary punching mechanism and revolving slitting disks.

9. A printing press comprising a type-cylinder and companion impression-roller therefor, separable revolving numbering-head cylinder and companion impression-roller therefor, a contact-cylinder for said numbering-heads also separable from said numbering-head cylinder, a rotary punching mechanism and revolving slitting disks.

10. A printing press comprising a type-cylinder and companion impression-roller therefor, separable revolving numbering-head cylinder and companion impression-roller therefor, a contact-cylinder for said numbering-heads also separable from said numbering-head cylinder simultaneously with the impression-roller therefor, a rotary punching mechanism the engaging ends of the dies of which constantly face each other, and revolving slitting disks.

11. A printing press comprising an adjustable primary type-cylinder and companion impression-roller therefor, an adjustable secondary type-cylinder and companion impression-roller therefor, an adjustable revolving numbering-head cylinder and companion impression-roller therefor, a contact-cylinder for the numbering-heads carried by said cylinder, a rotary punching mechanism the engaging ends of the dies of which constantly face each other, and revolving slitting disks.

12. A printing press comprising a separable primary type-cylinder and companion impression-roller therefor, a separable secondary type-cylinder and companion impression-roller therefor, a separable revolving numbering-head cylinder and companion impression-roller therefor, a contact-cylinder for the numbering-heads carried by said cylinder, a rotary punching mechanism, and revolving slitting disks.

13. A printing press comprising a transversely adjustable and separable primary type-cylinder and companion impression-roller therefor, a transversely adjustable and separable secondary type-cylinder and companion impression-roller therefor, a transversely adjustable and separable revolving numbering-head cylinder and companion impression-roller therefor, a contact-cylinder for the numbering-heads carried by said cylinder, a rotary punching mechanism, and revolving slitting disks.

14. A printing press comprising suitable side-frames having suitable elongated guide-ways therein, bearing-blocks adjustable longitudinally in said guide-ways, type-cylinder and companion impression-roller respectively journaled in said blocks, plates secured to the outer faces of the bearing-blocks in which said impression roller is journaled, a transverse-rock-shaft journaled in bearings in said side-frames in alinement with said guide-ways and having eccentric extensions that enter suitable openings therefor in said plates.

15. A printing press comprising suitable side-frames having suitable elongated guide-ways therein, bearing-blocks adjustable longitudinally in said guide-ways, a primary type-cylinder, and companion impression-roller therefor respectively journaled in the bearing-blocks in one pair of said guide-ways, a secondary type-cylinder and companion impression-roller therefor, respectively journaled in the bearing-blocks in another pair of said guide-ways, plates secured to the faces of the bearing-blocks in which said impression-rollers are journaled, transverse rock-shafts respectively journaled in said side-frames adjacent to the ends of the guide-ways nearest said impression rollers having eccentric extensions that enter suitable openings therefor in said plates, and means for operatively connecting said rock-shafts.

16. A printing press comprising a type-cylinder and companion impression-roller therefor, a numbering-head cylinder and impression-roller therefor, and punching mechanism consisting of two pair of corresponding gears, hangers pivoted to said gear eccentric thereto, means for maintaining said hangers in the same relative position, and punches carried by said hangers.

17. A printing press comprising a type-cylinder and companion impression-roller therefor, a numbering-head cylinder and impression-roller therefor, and punching mechanism consisting of two pair of corresponding gears, hangers pivoted to said gear eccentric thereto, rock-shafts journaled in and connecting said hangers, punches secured to and carried by said shafts, and means for maintaining said hangers in the same relative position.

18. A printing press comprising a type-cylinder and companion impression-roller therefor, a numbering head-cylinder and impression-roller therefor, and punching mechanism consisting of two pair of corresponding gears, hangers pivoted to said gear eccentric thereto, rock-shafts journaled in and connecting said hangers, punches secured to and carried by said shafts, a rod connected to the holder of a punch carried by one hanger and having reciprocal engagement with the holder of the opposing punch carried by the other hanger.

19. A printing press comprising a type-cylinder and companion impression roller therefor, a numbering head-cylinder and impression-roller therefor, a punching mechanism consisting of two pair of corresponding gears, hangers pivoted to said gear eccentric thereto, rock-shafts journaled in and connecting said hangers, punches secured to and adjustable longitudinally upon said shafts, a rod connected to the holder of a punch carried by one hanger and having reciprocal engagement with the holder of the opposing punch carried by the other hanger.

20. A printing press comprising a supply-roller, a pair of type-cylinders, simultaneously adjustable companion impression rollers therefor, an idle-roller located in the path of the web of paper mediate said supply-roller and one of said type-cylinders, and a draft-roller engaging said idle-roller and having spiral grooves in its circumference.

21. A printing press comprising a transversely adjustable supply-roller, a type-cylinder and companion impression-roller therefor, an idle-roller located in the path of the web of paper mediate said supply-roller and type-cylinder, and a draft-roller engaging said idle-roller and capable of separation therefrom and having spiral grooves in its circumference.

22. A printing press comprising a supply-roller, a pair of simultaneously adjustable impression cylinders and their companion type cylinders, an idle-roller located in the path of the web of paper mediate said supply-roller and type-cylinders, a draft-roller having spiral grooves in its circumference, spring-controlled arms in which said draft-roller is journaled pivotally supported on the frame of the press, whereby said draft-roller is kept normally in engagement with said idle-roller.

23. A printing press comprising, supply-roller, a type-cylinder and its companion impression-roller, an idle-roller located in the path of the web of paper mediate said supply-roller and type-cylinder, a draft-roller normally engaging said idle-roller having spiral grooves in its circumference, pivoted arms in which said draft-roller is journaled, spring-controlled rods operatively connected to said arms opposite their pivoted ends, and means for reciprocating said rods.

24. A printing press comprising a supply-roller, a type-cylinder and companion impression-roller therefor, an idle-roller located in the path of the web of paper passed through the machine mediate said supply-roller and type-cylinder, a draft-roller normally engaging said idle-roller having spiral grooves in its circumference, pivoted arms in which said draft-roller is journaled, spring-controlled rods operatively connected to said arms opposite their pivoted ends, a rock-shaft, eccentrics secured thereto which engage the ends of said rods farthest from said draft-roller.

25. A printing press comprising a supply-roller, a type-cylinder and companion impression-roller therefor, an idle-roller located in the path of the web of paper passed through the machine mediate said supply-roller and type-cylinder, a draft-roller normally engaging said idle-roller, pivoted arms in which said draft-roller is journaled, spring-controlled rods operatively connected to said arms opposite their pivoted ends, a rock-shaft, eccentrics secured thereto which engage the ends of said rods farthest from said draft-roller.

26. A printing press comprising suitable side-frames having elongated guide-ways therein, bearing-blocks adjustable longitudinally therein, a type-cylinder journaled in one pair of said blocks and companion impression-roller journaled in the other pair of said blocks and operatively engaging said type-cylinder, a threaded stud secured to and projecting from one of said side-frames, a frame adjustable longitudinally on said stud, and having openings therein engaged by the adjacent extended ends of the journals of said cylinder and roller and adapted to hold the same in the longitudinal position to which they may be adjusted.

27. A printing press comprising suitable side-frames having elongated guide-ways therein, bearing-blocks adjustable longitudinally therein, a type-cylinder journaled in one pair of said blocks and companion impression-roller journaled in the other pair of said blocks and operatively engaging said type-cylinder, a threaded stud secured to and projecting from one of said side-frames, a frame adjustable longitudinally on said stud, and having openings therein engaged by the adjacent extended ends of said cylinder and roller which permit the separation of the same and are adapted to hold the same in the longitudinal position to which they may be adjusted.

In testimony whereof we have hereunto set our hands this 8th day of March, 1904.

ENGLAND J. BARKER.
MATTHEW J. BARKER.
FRANK B. LA BARR.

Witnesses:
FRANK D. THOMASON,
E. K. LUNDY.